Aug. 5, 1930.  J. H. GARTNER  1,772,138
TIRE PRESSURE INDICATOR SWITCH
Filed Jan. 31, 1927  2 Sheets-Sheet 1
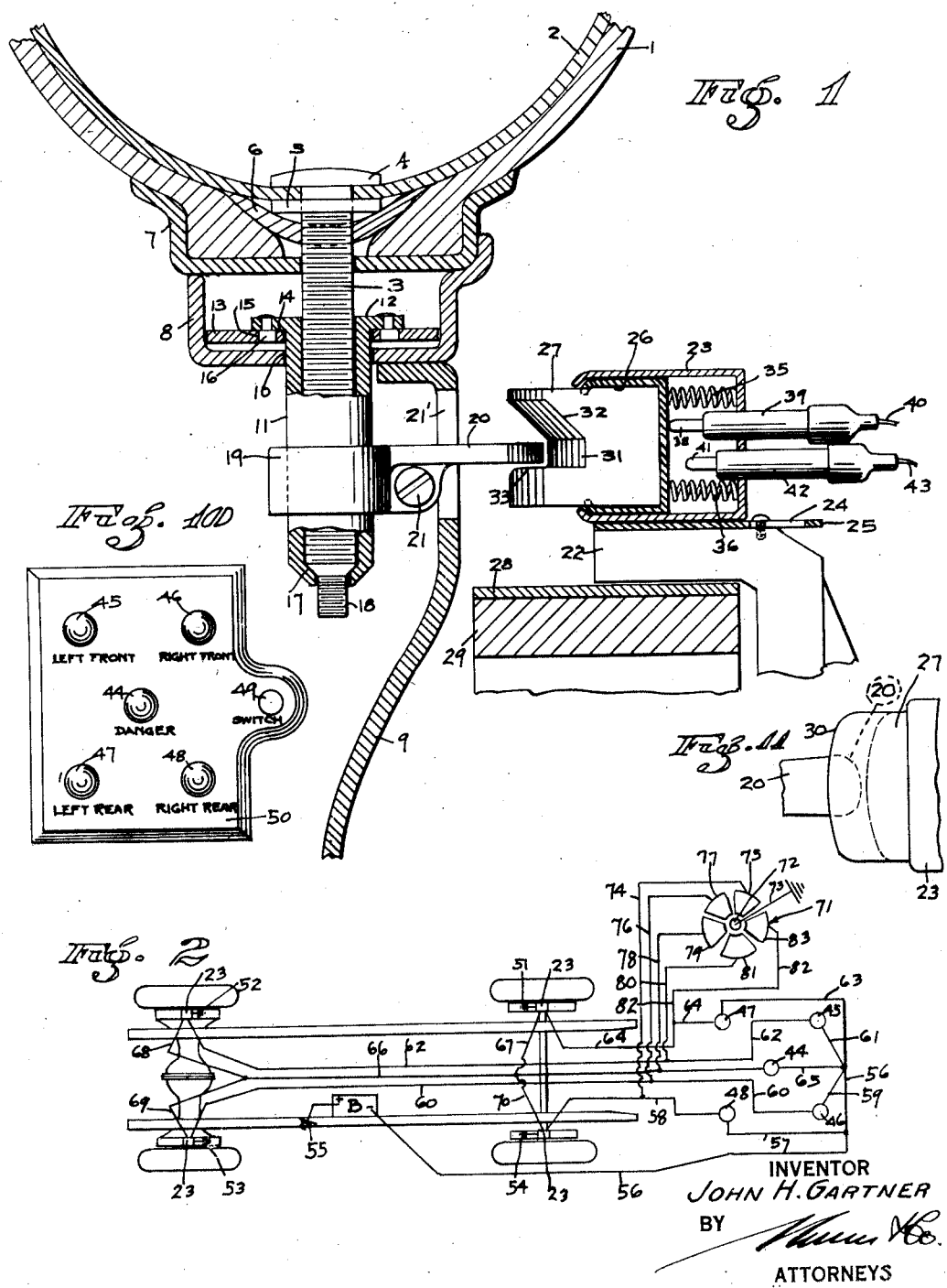
INVENTOR
JOHN H. GARTNER
BY
ATTORNEYS Aug. 5, 1930.  J. H. GARTNER  1,772,138
TIRE PRESSURE INDICATOR SWITCH
Filed Jan. 31, 1927  2 Sheets-Sheet 2
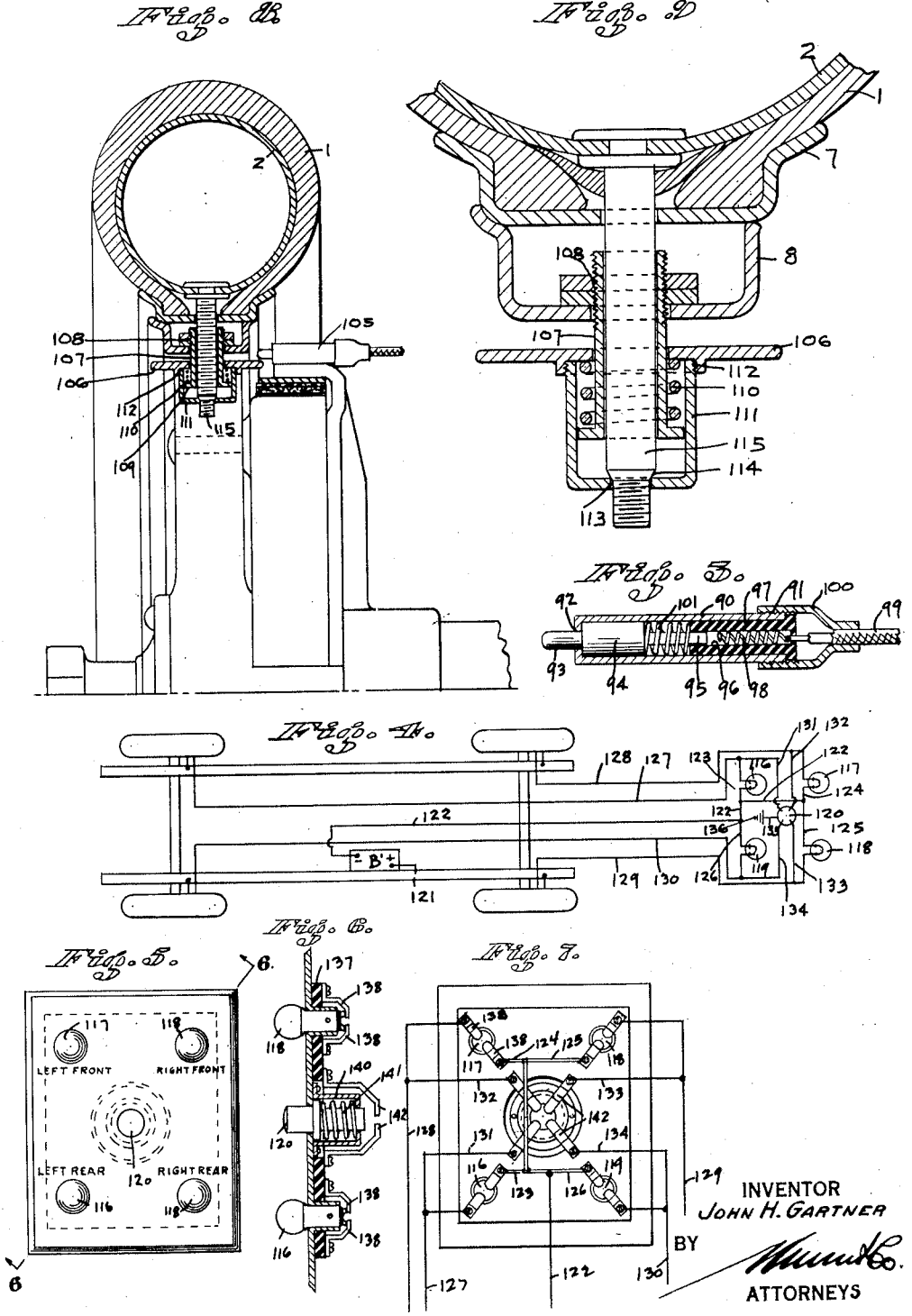
INVENTOR
John H. Gartner
BY
ATTORNEYS Patented Aug. 5, 1930

1,772,138

UNITED STATES PATENT OFFICE

JOHN H. GARTNER, OF SAN FRANCISCO, CALIFORNIA, ASSIGNOR OF ONE-FIFTH TO PATRICK S. HIGGINS, ONE-FIFTH TO JAMES D. SKELLY, AND ONE-FIFTH TO WILLIAM SHACKLETON

TIRE-PRESSURE-INDICATOR SWITCH

Application filed January 31, 1927. Serial No. 165,021.

This invention relates to devices for indicating pressure in pneumatic tires and more particularly to that class of device that will indicate pressure while the car is in motion.

With the advent of the balloon tire that requires a low, but accurate pressure, it has become increasingly imperative to know the pressure in the tires at all times under all running conditions. Especially, since the low pressure is subject to greater fluctuations with minor causes. A tire may "come up" during running time due to a hot or a rough road bed, or it may "go down" because of a small leak. In either event it is essential that the driver know what has happened to avoid damaging the tires.

One object of this invention is to provide a system of pressure indicating that will permit the driver of a vehicle, equipped with pneumatic tires, to sit in the driver's seat and know when each tire is properly inflated.

Another object is to provide a system that is readily installable on all types of cars.

A particular advantage of this invention resides in the fact that after a signal has been given notifying the driver that one, or possibly more, of his tires is under inflated, if the tire continues to deflate a second signal warns him that the pressure has arrived at the danger point.

A further advantage is in the tell-tale lamps placed in a convenient visible place in the driver's compartment that not only tells when the pressure is down in a tire but tells which tire it is.

A still further advantage occurs due to the fact that in case the pressure comes up in any tire, due to running conditions, or if it is over-inflated at the start, the same tell-tale lamps signal which tire it is.

With this arrangement the driver may sit in his seat, and without ever stopping, know that his tires are neither "too hard" nor "too soft."

In order to know that the system is operating in perfect order, a test switch is provided that may be used at any time to prove that the tell-tale lamps are all in working order and are ready to signal in case the tires become improperly inflated.

These objects and advantages together with any subsequent ones that may be developed in the description and specification constitute my invention, which is more fully shown by the drawings, in which;

Figure 1 shows the contact and pressure gauge member installed on a disc wheel;

Figure 2 shows wiring diagram as applied to automobiles;

Figure 3 shows a sectional view of contact member;

Figure 4 shows a modified form of the wiring of the system as applied to an automobile;

Figure 5 shows a modified form of the tell-tale lamps and switch;

Figure 6 shows a section on line 6—6 of Figure 5;

Figure 7 shows a bottom plan view of a modified form of tell-tale lamp board and switch;

Figure 8 shows modification as applied to artillery wheel;

Figure 9 shows an enlarged fragmentary view of Figure 8;

Figure 10 shows tell-tale lamp board and switch as used in connection with wiring diagram of Figure 2; and Figure 11 is a fragmentary plan view of a portion of Figure 1.

Referring now to the drawings for a more detailed description:

In Figure 1 the casing of an ordinary tire is designated by the numeral 1 inside of which is the inner tube 2. The inner tube 2 has the standard valve stem 3 provided with a basal flange 4 which is inserted into the tube 2 and held air tight by screwing down the nut 5. In most cases a liner strip 6 is inserted between the abutting ends of the casing and serves to keep the inner tube from touching the rim 7 which carries the casing. In this case an ordinary rim is shown mounted on a smaller channel like structure 8, which is the felloe of the disc wheel. Joined to the channel either welded or riveted is the disc 9 of the wheel.

The web of the channel 8 is provided with an opening 10 through which a tube 11 extends. The inner end of said tube is provided with a basal flange 12, which flange rests upon a concavo-convex leaf spring 13, which spring is also provided with an opening 14 through which the tube 11 extends. Small holes 15 are also drilled in the spring 13 into which are fitted protruding sections 16 of rivets, which are securely fastened to the flange 12. These interlocking rivet or bolt sections serve as a stop against rotating the sleeve 11 relative to the stem, and since the spring 13 is a fairly close fit to the channel and extends for some distance either side of the valve stem it can readily be seen that no rotating movement can take place. The outer end of the hollow tube 11 is restricted as at 17 and holds the restricted end 18 of the valve stem 3.

Mounted on tube 11 is a clamp 19 provided with a lateral extension 20 and frictionally held in position by the screw 21. The disc 9 of the wheel is slotted as at 21' to allow the extension 20 to project through. The outer end of 20 is arcuately shaped as at 20' shown in Figure 11.

Adjustably mounted on the brake drum bracket 22 is a box-like casing 23, which may be moved forward or back as permitted by the slot 24 in plate 25, said plate 25 being suitably joined to the casing 23. This permits any adjustment necessary for different distances on different makes of cars. The bracket 22 supports the regulation brake band 28 and lining 29.

Slidably mounted within 23 is another box-like casing 26 which carries a striking member 27 made of suitable material to resist wear and operate noiselessly. The outer end is arcuately shaped as at 30 in Figure 11. Cut in the arcuate face 30 is a slot 31, the upper side of which is bevelled as at 32 while the lower side is flat as at 33. The purpose of this slot is to provide a striking face and would operate in the following manner:

As the pressure in the tube 2 becomes subnormal the spring pressure overcomes the air pressure and causes the hollow tube 11 to rise, thus forcing the valve stem 3 into the tube itself. In order to obtain a normal condition where the pressure from the tube exerts sufficient force to hold the spring in a predetermined position it is only necessary to know the pressure required and to supply a spring corresponding to said pressure. The clamp 19 serves for adjusting the extension 20 until at normal pressure it travels in the position shown in Figure 1.

On the other hand when the tube 2, becomes overinflated the extension 20 is forced down. This movement results in the lower part of the member 27 being struck by the moving extension 20. Hence it can be seen that the member 31 is suddenly forced in against the contactors 39 and 42, which close the circuits that operate two of the tell-tale lamps.

It is to be noted that the member 19 may be positioned where desired on the tube 11 by loosening the screw 21, setting member 19, and tightening the screw.

Consequently as the tube 11 travels upward the extension 20 rises and strikes the bevelled face 32 and since neither 20 nor 27 can rotate, a pushing force is set up which drives 27 and its casing 26 backward into the outer casing 23. Springs 35 and 36 normally hold the striking member 27 fully extended. As it is forced back it causes the pin 38 to make a contact in the contactor 39, which pin 38 grounds the circuit into the bracket 22 and thus into the frame of the car. The other part of the circuit comes in through the conductor 40 which conductor in turn connects to one of the tell-tale lamps. Then as the pressure continues to decrease the extension 20 continues to travel up the bevelled face 32 which forces the member 27 still further back until it engages pin 41 carried in the contactor 42 and makes a contact identical with the one described above. In this case the incoming conductor 43 comes from the lamp 44 which signifies danger and is a common lamp to the four wheels.

In Figure 2 is exemplified a possible wiring diagram as applied to any standard make of automobile.

There is mounted on the brake bracket of each wheel the said casing 23 containing the two contacting members and a striking member also in the wheel itself, as shown in Figure 1. The casing itself is grounded to the frame as shown at 51—52—53 and 54.

Starting at the battery "B" one side of which is grounded as at 55 to the frame, a conductor 56 leads to the tell-tale lamp board 50. A conductor 57 leads to lamp 48 from which another conductor 58 leads to the contact member 39. One side of lamp 46 is connected to the battery through conductor 59 and the other side through conductor 60 is connected to the contactor 39. Conductor 61 connects one side of lamp 45 to the battery, while conductor 62 connects the other side to the contactor 39. One side of lamp 47 is connected to the battery by conductor 63 and the other side is connected to the contactor by conductor 64.

One side of lamp 44 which is a lamp common to the four wheels, receives its energy from the battery through conductor 65; the other side of the lamp is connected to the four contactors 42 by the conductor 66 to which are joined in multiple connection the conductors 67—68—69 and 70.

As part of the tell-tale board there is provided a switch devised to test the lamps as to working order. It is so constructed and "hooked up" that all the lamps may be "shorted out" at one time, and any lamp that does not burn is immediately detected.

In order to do this a five-prong switch generally designated 71 is provided with a central push pin 72 which engages all prongs and grounds them through the conductor 73.

A conductor 74 connects conductor 58 to a switch prong 75. This "shorts out" lamp 48.

A conductor 76 connects conductor 60 to a switch prong 77. This "shorts out" lamp 46.

A conductor 78 connects conductor 66 to a switch prong 79. This "shorts out" the common lamp 44.

A conductor 80 connects conductor 62 to a switch prong 81. This "shorts out" lamp 45.

A conductor 82 connects conductor 64 to a switch prong 83. This "shorts out" lamp 47.

In Figure 3 a sectional view of a contacting pin is shown and comprises an outer shell 90 threaded at the open end as at 91 and closed at the opposite end except for a hole 92 to allow the pin 93 to extend out, which pin is fixed to a slidable piston 94 that is carried in the cylinder of the outer shell 90. The piston 94 carries another pin 95 which is designed to slide in a hole 96 provided in the insulation sleeve 97. Also contained within the hole 96 is a coiled wire 98, connected to the conductor 99 which conductor in turn is connected to a lamp. A screw threaded cap 100 holds the assembly in place. As the pin 93 is forced back into the shell against the helical spring 101 the pin 95 contacts with the coiled wire 96 and the circuit is shorted to the frame through the pin 95 and the outer shell 90. The wire 98 is coiled to permit the pin 95 to travel after the contact is made. This would be necessary in the case where two contactors are used, and where one engages ahead of the other.

In Figure 8 is shown a modification of my device as it would be used in conjunction with artillery wheels, and without the common danger lamp. In this case only one contactor 105 is used which engages the striker 106. The method of bringing the striker up into the striking zone employs the same principle with a slight variation. Here the tubular member 107 is screw threaded as at 108 and fixedly attached to the felloe of the wheel. At its outer end it is provided with a flange 109, which flange serves as an abutment for the spring 110. The spring 110 bears upwardly against the striking flange 106, which flange is screw threaded and joined as at 112 to cap 111. Said cap 111 has a restricted opening 113 so designed as to engage the shoulder 114 of the valve stem 115.

In connection with this device the wiring diagram shown in Figure 4 would be used in which there are four lamps 116—117—118 and 119 and a switch 120. The energy comes from the battery B' one side of which is grounded to the frame as at 121, the other side being connected by conductor 122 to the tell-tale lamp board. Where it is led to lamp 116 by conductor 123; to lamp 117 by conductor 124; to lamp 118 by conductor 125; to lamp 119 by conductor 126.

From lamp 116 a conductor 127 leads to the contactor.

From lamp 117 a conductor 128 leads to the contactor.

From lamp 118 a conductor 129 leads to the contactor.

From lamp 119 a conductor 130 leads to the contactor.

From lamp 116 a conductor 131 leads to the switch 120.

From lamp 117 a conductor 132 leads to the switch 120.

From lamp 118 a conductor 133 leads to the switch 120.

From lamp 119 a conductor 134 leads to the switch 120.

From switch 120 a conductor 135 leads to a ground 136.

In Figure 6 a diagonal sectional view of the tell-tale lamp board is shown. Mounted on an insulation board 137 are a plurality of spring clips 138, which are adapted to receive and hold the lamps and are also designed to serve as conductors to said lamps.

The switch button 120 is held within a casing 140 and impelled outward by a spring 141. As the button is pushed inward it engages the prongs 142 and "shorts out" all the lamps, thus giving the aforementioned test.

The foregoing description and specification, together with the accompanying drawings show only one application with a slight variation of my idea. Since it is obviously possible to apply it in a great many ways, I understand I am entitled to such changes and modifications that do not depart from the scope of the drawings, specification and appended claims.

I claim:

1. A tire pressure indicator comprising a member movable in one direction by the air within a tire, yielding means for moving the member in the opposite direction, a pair of switches, a switch-actuating member placed nearer one of the switches than the other, said first-named member actuating said second-named member when the tire is either under-inflated or over-inflated and said switch actuating member being adapted to receive said first member for causing two lights to flash on and off when the tire is flat or overinflated, and to cause one light to flash when the tire is underinflated.

2. In a tire pressure indicator operated from the valve stem of a tube, a cylindrical member having an opening therein for receiving a valve stem and means for holding said member in a relatively fixed position whereby the stem of the inner tube may be freed of or placed into operative relation with the pressure indicator by merely guiding the valve stem in or out of said opening.

JOHN H. GARTNER.